United States Patent [19]
Palmieri

[11] Patent Number: 4,774,670
[45] Date of Patent: Sep. 27, 1988

[54] FLIGHT MANAGEMENT SYSTEM

[75] Inventor: Anthony P. Palmieri, Canyon Country, Calif.

[73] Assignee: Lockheed Corporation, Calabasas, Calif.

[21] Appl. No.: 728,079

[22] Filed: Apr. 29, 1985

[51] Int. Cl.$^4$ ............................................. G06F 15/50
[52] U.S. Cl. .................... 364/446; 364/440; 244/182
[58] Field of Search ............... 364/440, 443, 446, 434, 364/424; 244/181, 182, 183, 189, 76 R

[56] References Cited

U.S. PATENT DOCUMENTS

| | | | |
|---|---|---|---|
| 3,443,073 | 5/1969 | Cohen | 364/446 |
| 3,691,356 | 9/1972 | Miller | 244/182 |
| 3,816,716 | 6/1974 | De Garmo | 235/150.2 |
| 3,868,497 | 2/1975 | Xietor | 364/440 |
| 3,981,442 | 9/1976 | Smith | 244/182 |
| 4,093,158 | 6/1978 | Clews et al. | 364/440 |
| 4,216,530 | 8/1980 | Yamaki et al. | 364/565 |
| 4,277,041 | 7/1981 | Marrs et al. | 244/182 |
| 4,467,429 | 8/1984 | Keudig | 364/440 |

FOREIGN PATENT DOCUMENTS 2813189  9/1979  Fed. Rep. of Germany.
 126342  3/1978  Japan.

OTHER PUBLICATIONS

Weaver, B., Moor, D., Palmieri, A., "Time Plus–The 4-D Flight Management System", Lockheed Horizons, Issue Fifteen, 5-84, pp.20-32.

Lee, H. P., Leffler, M. R., "Development of the L-1011 Four Dimensional Flight Management System", NASA Contractor Report, Jul. 1982.

Primary Examiner—Gary Chin
Attorney, Agent, or Firm—F. P. Smith; L. L. Dachs

[57] ABSTRACT

An improvement to a Flight Management System (FMS) for an aircraft is described. The improvement comprises: a system coupled to the flight management system for accepting flight data information, including a required time of arrival, and for generating therefrom an estimated arrival time and deriving from the estimated arrival time a signal representative of the required airspeed needed to allow the aircraft to reach a particular point at the required arrival time; and a system for receiving the signal and for generating an output signal for modifying the actual airspeed of the aircraft to correspond to the required airspeed. The signal is derived by applying to the actual airspeed a correctional factor which is a function of the estimated arrival time and the required arrival time. The correctional factor is generated from the ratio of the difference of the estimated arrival time and the required arrival time to the required arrival time. The estimated arrival time is a function of the flight data information which includes the actual airspeed, flight plan data, and wind data. The actual airspeed is incrementally or decrementally modified. The required airspeed is repetitively generated. The output signal is coupled to the aircraft's autothrottle to modify the output thereof to attain and to maintain the required airspeed. The system coupled to the flight management system further generates a time flexibility for determining whether the aircraft is capable of reaching the particular point in space at the particular time.

12 Claims, 2 Drawing Sheets

VERTICAL FLIGHT PROFILE

HORIZONTAL FLIGHT PROFILE

FLIGHT MANAGEMENT SYSTEM

TECHNICAL FIELD

The invention relates to the field of Flight Management Systems for aircraft and, in particular, to a Flight Management System using time-based control during cruise.

BACKGROUND INFORMATION

During the 1970's fuel costs sharply increased. In addition, air traffic delays and airport congestion steadily grew worse. As a result, a manual navigational system for local flow traffic management was introduced in 1976. The system utilized fuel conservative profile descents which reduced low altitude flying times. Subsequently, the system was automated.

The automated system currently being utilized is a time-based metering system. Under this automated system, each arriving aircraft is assigned by the Air Traffic Controllers (ATC) a computer-calculated time to cross a metering fix (M*F) based on the airport's acceptance rate (see FIGS. 2 and 3). These metering fixes are usually located 25 minutes from the airport and a computer calculates the arrival time of an aircraft based on the time to cross the metering fix. The assigned metering fix times are displayed to the ATC. The ATC continuously check these times to determine if the acceptance rate of the airport will be exceeded. If the ATC detects that the airport acceptance rate will be exceeded, the aircraft may be delayed at the metering fix which is located in high altitude enroute airspace. As a result, fuel inefficient low-altitude delay maneuvers, and air traffic congestion in the immediate vicinity of the airport have been significantly reduced.

A Flight Management System (FMS) is presently available which is an extension of the area navigation (RNAV) capability originally certified for aircraft in 1971. It performs the basic RNAV functions of waypoint navigation and coupled guidance as well as tuning of the aircraft's VOR/DME receivers (Variable Omnidirectional Range/Distance Measuring Equipment), the automatic selection of VORTAC (collocated VOR and DME Facilities) stations, and the mixing of inertial, radio, heading and air data sensor inputs to provide optimal navigation accuracy and automatic control of engine parameters for all phases of flight. The system is comprised of a computer, a CRT control and display unit (CDU), and a CRT map display. This system merely informs the pilot of the aforementioned flight data for any given flight condition.

Accordingly, it is a general object of the present invention to provide an improved Flight Management System.

It is another object of the present invention to provide an improved Flight Management System which includes time-based control of an aircraft during cruise.

It is a further object of the present invention to provide an improved Flight Management System which includes time-based control of an aircraft during cruise which is capable of delivering an aircraft to a particular point in space at a required arrival time.

DISCLOSURE OF INVENTION

An improvement to a Flight Management System (FMS) for an aircraft is described. The improvement comprises: a system coupled to the flight management system for accepting flight data information, including a required time of arrival, and for generating therefrom an estimated arrival time and deriving from the estimated arrival time a signal representative of the required airspeed needed to allow the aircraft to reach a particular point at the required arrival time; and a system for receiving the signal and for generating an output signal for modifying the actual airspeed of the aircraft to correspond to the required airspeed. The signal is derived by applying to the actual airspeed a correctional factor which is a function of the estimated arrival time and the required arrival time. The correctional factor is generated from the ratio of the difference of the estimated arrival time and the required arrival time to the required arrival time. The estimated arrival time is a function of the flight data information which includes the actual airspeed, flight plan data, and wind data. The actual airspeed is incrementally or decrementally modified. The required airspeed is repetitively generated. The output signal is coupled to the aircraft's autothrottle to modify the output thereof to attain and to maintain the required airspeed. The system coupled to the flight management system further generates a time flexibility for determining whether the aircraft is capable of reaching the particular point in space at the particular time.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BEST MODE FOR CARRYING OUT THE INVENTION

Figure 1:
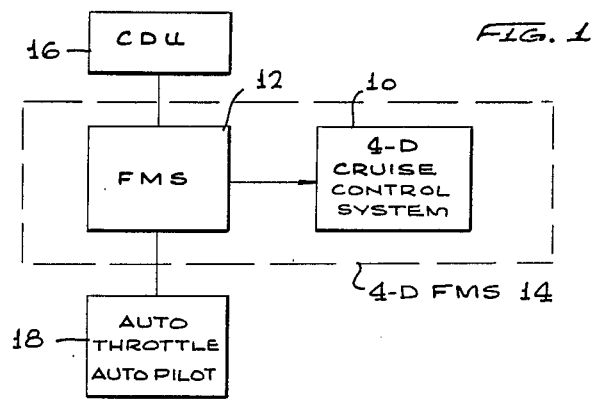
FIG. 1 is a block diagram of the 4-D Flight Management System.

The basic system configuration is shown in FIG. 1. The 4-D cruise control system 10 receives data from and interfaces with the Flight Management System (FMS) 12. A suitable commercially available Flight Management System is produced by the Arma Division of Hamilton Standard. This combination forms a 4-D FMS 14. A control and display unit (CDU) 16 provides a flight crew interface with the 4-D FMS 14. The 4-D FMS 14 is coupled to the autothrottle and autopilot 18 for effecting airspeed changes.

Figure 2:
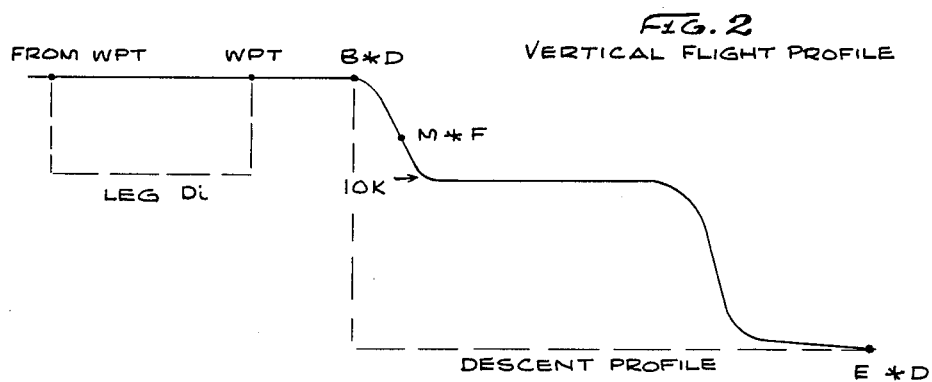
FIG. 2 shows a vertical profile of a flight plan.
Figure 3:
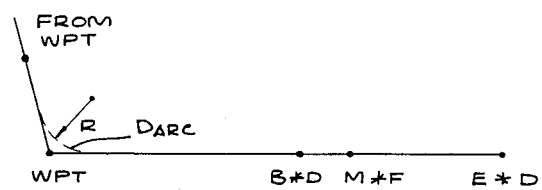
FIG. 3 shows a horizontal profile of a flight plan.
Figure 4:
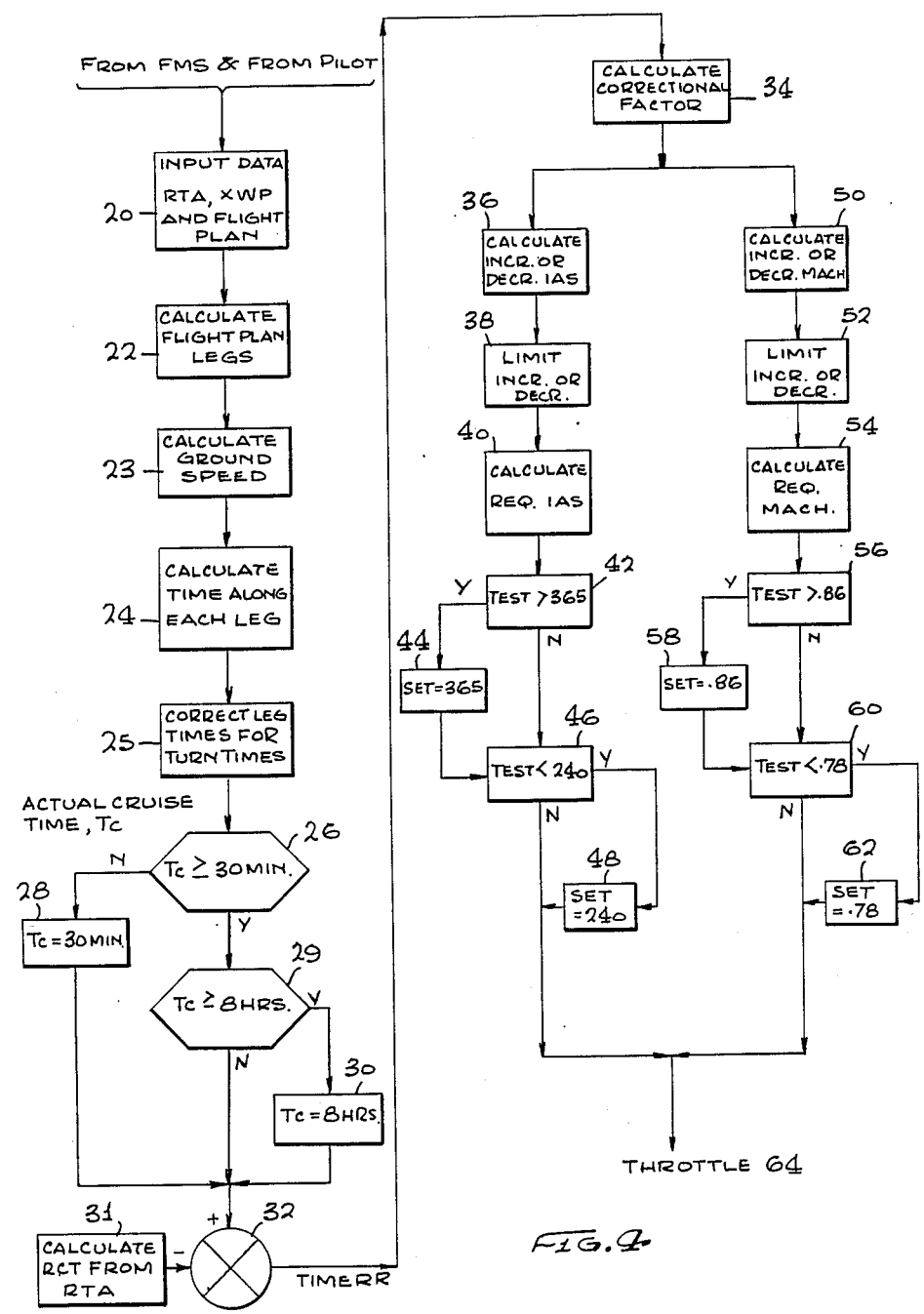
FIG. 4 shows the preferred embodiment of the present invention.

In operation, the pilot, after takeoff, selects the route to be flown and establishes a flight plan as shown in FIGS. 2 and 3. As shown in FIG. 4, block 20, the pilot then inputs the flight plan into the CDU. The flight plan includes the determination of waypoints (WPT), the end of descent point (E*D) and the metering fix point (M*F), from which the estimated time enroute to the beginning of descent point (B*D) may be calculated, as described hereinafter, when the aircraft is in cruise. The required arrival time (RTA) to E*D and M*F are entered, as indicated by box 20, when known.

Using the latitude and longitude coordinates of each WPT, the total flight plan leg distance, i.e., the distance from E*D through each WPT to the present aircraft position (from WPT), is calculated in box 22 by the FMS 12. This is done one leg at a time with each leg beginning and ending with a WPT. The leg distances are then summed up. The distances for each leg ($D_i$) are calculated to ±0.5 feet and stored in an array. The headings for each leg are also calculated to 0.001° and stored in an array. This data is later used to calculate the travel time along each leg. This calculation is repeated every 1.5 seconds.

The pilot also enters in box 20 the predicted wind direction (XWP) and magnitude (VWP) at each WPT in the flight plan, including B*D, M*F, and E*D, through the use of the CDU. The descent wind (VWD) between B*D and E*D is segmented into 500 foot altitude intervals and stored in an array. Using a descent wind model, the wind velocity at each altitude level is estimated based on a blend of the forecast wind ($VWF_i$) and modeled linear wind ($VWL_i$). Modifying the equation for the standard deviation of the forecast wind to correct for the age of the forecast and the climatological standard of deviation for the modeled linear wind, the descent wind (VWD) is given by $$VWD_i = \frac{(1 - \rho_i^2) VWF_i + 2(1 - r) VWL_i}{(1 - \rho_i^2) + 2(1 - r)}$$

where
 $\rho_i$ = is the correlation coefficient for a particular geographic location
 r = lag correlation for a particular geographic location The predicted cruise wind at each WPT is a function of the measured wind (VWM) at the present WPT and the forecasted wind ($VWF_i$) at each WPT. Using the standard of deviation of the forecast wind for a given location and the standard of deviation of the measured wind at a given WPT, the estimated wind (VWP) at a WPT is given by the sum of $VWF_i$ and VWM, or $$VWP_i = \frac{1.69 (D_i)^2 VWF_i + 16 T(VWM)}{1.69 (D_i)^2 + 16 T}$$

where
 T = the age of the forecast
 $D_i$ = the direction distance between the current aircraft position and the waypoint In the cruise mode, an average wind (VW) and wind heading (XW) is calculated for each leg using vector summation of magnitude and direction. For the present leg that the aircraft is on, actual measured wind is used. The north-south and east-west components of the wind at a WPT are:

$VWPx = VWP \sin (XWP)$ $VWPy = VWP \cos (XWP)$ where XWP is the predicted wind heading.

The north-south and east-west components of the wind along the straight-line segment $D_i$ are given by the average of the wind along the leg:

$VWPx_i = (VWPx_{i+1} + VWPx_i)/2$ $VWPy_i = (VWPy_{i+1} + VWPy_i)/2$ and the average wind (VW) along segment $D_i$ is given by:

$VW_i = [(VWPx_i)^2 + (VWPy_i)^2]^{\frac{1}{2}}$ and the wind heading (XW) of segment $D_i$ is given by:

$$XW_i = \text{Tan}^{-1} \frac{VWPx_i}{VWPy_i}$$

This calculation is repeated every 1.5 seconds.

Using vector summation of true airspeed (Vu) and average wind (VW), the average ground speed (Vg) is calculated in box 23. The ground speed ($Vg_i$) along the leg is then:

$$Vg_i = Vu[1 - A_i^2 \sin^2 (Z_i)]^{\frac{1}{2}} + A_i \cos (Z_i) \qquad \text{(eq. 1)}$$

where $A_i = VW_i/Vu$, $Z_i = Xg_i - XW_i$
 $Xg_i$ is the ground track heading along the leg.

Using the ground speed ($Vg_i$) as calculated in equation 1 above for each leg and the distance ($D_i$) along each leg as previously calculated, the predicted time to travel each leg is calculated in box 24 by:

$$t_i = \frac{3600}{Vg_i} D_i$$

substituting in $Vg_i$ from equation 1

$$t_i = \frac{3600}{Vu} D_i f_2 (A_i, Z_i) \qquad \text{(eq. 2)}$$

where $$f_2 = \frac{1}{[1 - A_i^2 \sin^2 (Z_i)]^{\frac{1}{2}} + A_i \cos(Z_i)}$$

and stored in an array.

While the time to travel the straight portion of the leg has been computed above, an aircraft, however, travels a turn in approximately the arc of a circle ($D_{arc}$) as shown in FIG. 3. Thus, the time must be corrected in box 25 by the difference between the straight leg portion and the curvilinear portion ($D_{arc}$) to yield the actual cruise time. The turn radius of the arc is given by:

$D_{arc} = (R) \text{Tan} (Xg/2)$ where $Xg = Xg_{i+1} - Xg_i$
and where the time to travel $D_{arc}$ is given by $$t_{arc} = \frac{(3600) D_{arc}}{Vg_i}$$

Substituting in the ground speed from equation 1, the time to travel the arc portion is $$t_{arc} = \frac{3600 (R) \text{Tan} (Xg/2)}{V_u} f_2 (A_i, Z_i)$$

where $f_2$ is defined in equation 2.

The actual cruise time ($T_c$) is computed from the summation of the leg times and cruise arc times:

$$T_c = \frac{3600}{V_u} [D_i + (R) \tan(Xg/2)] f_2 (A_i, Z_i)$$

This is calculated every 1.5 seconds.

If the actual cruise time ($T_c$) is less than a low limit of 30 minutes (box 26) or greater than an upper limit of eight hours (box 29), the actual cruise time is set equal to the respective limits (boxes 28, 30). These are practical limits and indicate the onset of descent and the fuel range capacity of the aircraft, respectively.

A descent time ($T_D$) is calculated from a descent model of the descent profile shown in FIG. 2. The descent model is generated in six segments, back-computed from the specified end-of-descent point (E*D) to the beginning-of-descent point (B*D). The model is established by the sequential buildup of incremental ranges ($\Delta r_i$) and altitudes ($\Delta h_i$) for each of the six segments. $\Delta h$ is set to a constant value of 500 feet except for the level flight segments or transitions to or from level flight segments. The corresponding $\Delta r$'s are then computed as a function of $\Delta h$ using prestored data. The point at which the back-computed profile intersects cruise altitude is the beginning-of-descent point B*D. B*D is automatically entered as a waypoint by the FMS. The total descent time is calculated from the beginning of descent B*D to the E*D.

The required cruise time is then calculated in box 31 from the difference between the RTA to E*D given by the ATC and the descent time. A timer error (TIMERR) is calculated in box 32 from the difference between the required cruise time and the actual cruise time. This TIMERR is used as a feedback parameter.

The system correctional factor necessary to achieve the required cruise time is derived in box 34 from the ratio of the TIMERR to the required cruise time. Incremental or decremental speed signals are derived from the correctional factor times the present Mach number in box 50 and from the correctional factor times the present indicated airspeed in box 36. The magnitude of the incremental or decremental speed signals is limited in boxes 38 and 52 to the rate at which it is desired that the physical aircraft accelerate or decelerate. These step limits are 0.015 Mach and 15.6 knots.

Required airspeed signals are then derived in order to drive TIMERR to zero. The required airspeed signals are derived in boxes 40 and 54 by summing the actual indicated airspeed and the Mach number with the respective limited incremental or decremental speed signals from boxes 38 and 52. Regarding boxes 42 and 56, if the required airspeed signals are greater than the maximum operating speed of the aircraft (365 knots or 0.86 Mach), they are set equal to these limits, as shown in boxes 44 and 58. Regarding boxes 46 and 60, if the required airspeed signals are less than the low operating speed limit (240 knots or 0.78 Mach), they are set equal to these limits, as shown in boxes 48 and 62. The required airspeed signals are then coupled (64) to a suitable cruise speed control system such as the system provided in U.S. Pat. No. 4,277,041 by G. J. Marrs, et al., entitled "Aircraft Cruise Speed Control System" which is incorporated by reference. The calculation of the required airspeed signals is repeated every 1.5 seconds.

The system is also provided with a time flexibility feature. The pilot using the time flexibility feature can determine whether the RTA to the M*F assigned by the ATC is within the aircraft's operating capabilities. If the RTA cannot be met, the ATC may be notified immediately.

Time flexibility consists of the sum of descent-time flexibility to, for example, 10,000 feet, and cruise-time flexibility as shown in FIG. 2. The descent-time flexibility is calculated for five standard descents using safe speed limits within the aircraft operating envelope. The high-speed limit is 0.86 Mach and 365 knots and the low-speed limit is 0.78 Mach and 240 knots. The descent-time flexibility from a given altitude at B*D to M*F is given by:

$$T_D = T_{ac} - T_{M*F}$$

where $t_{ac}$ is the time flexibility from the aircraft altitude at B*D to 10,000 feet and $T_{M*F}$ is the time flexibility from M*F to 10,000 feet.

Cruise-time flexibility $T_{cf}$ is calculated as a function of cruise distance D where $$T_{cf} = \frac{D}{V_{min}} - \frac{D}{V_o}$$

and $V_{min}$ is the minimum speed that can be flown and $V_o$ is the initial aircraft cruise speed.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

I claim:

1. An improvement to a flight management system for modifying the actual airspeed of an aircraft so as to deliver said aircraft to a particular point in space at a required arrival time, said improvement comprising:
   means coupled to said flight management system for accepting flight data information, including said required arrival time, actual air speed, flight plan data, and wind data and for repetitively generating therefrom an estimated arrival time and deriving from said estimated arrival time a signal representative of the required airspeed needed to allow said aircraft to reach said particular point at said required arrival time; and
   means for receiving said signal representative of said required air speed and for generating an output signal for modifying said actual airspeed of said aircraft to correspond to said required airspeed.

2. The improvement of claim 1 wherein said signal is derived by applying to said actual airspeed a correctional factor which is a function of said estimated arrival time and said required arrival time.

3. The improvement of claim 1 wherein said aircraft has an autothrottle and said means for generating said output signal is coupled to said autothrottle to modify the output thereof to attain and to maintain said required airspeed.

4. The improvement of claim 2 wherein said correctional factor is generated from the ratio of the difference of said estimated arrival time and said required arrival time to said required arrival time.

5. The improvement of claim 1 wherein said flight data information includes the linear distance between waypoints and the curvilinear distance at waypoints and said estimated arrival time is a function of said linear distance between waypoints and said curvilinear distance at waypoints.

6. The improvement of claim 1 wherein said required speed is generated for said aircraft during cruise.

7. The improvement of claim 1 wherein said required airspeed is repetitively generated.

8. The improvement of claim 1 wherein said actual airspeed is incrementally modified.

9. The improvement of claim 1 wherein said actual airspeed is decrementally modified.

10. The improvement of claim 1 further comprising display means for displaying said required arrival time, said required air speed and said actual airspeed coupled to said flight management system.

11. The improvement of claim 1 wherein said aircraft has predetermined operating capabilities and wherein said means coupled to said flight management system further generates a time flexibility signal for determining whether of said aircraft can reach said particular point in space at said required arrival time.

12. The improvement of claim 11 wherein said time flexibility signal comprising the maximum and minimum estimated constraints of said required arrival time within said operating capabilities.

* * * * *